Patented June 1, 1926.

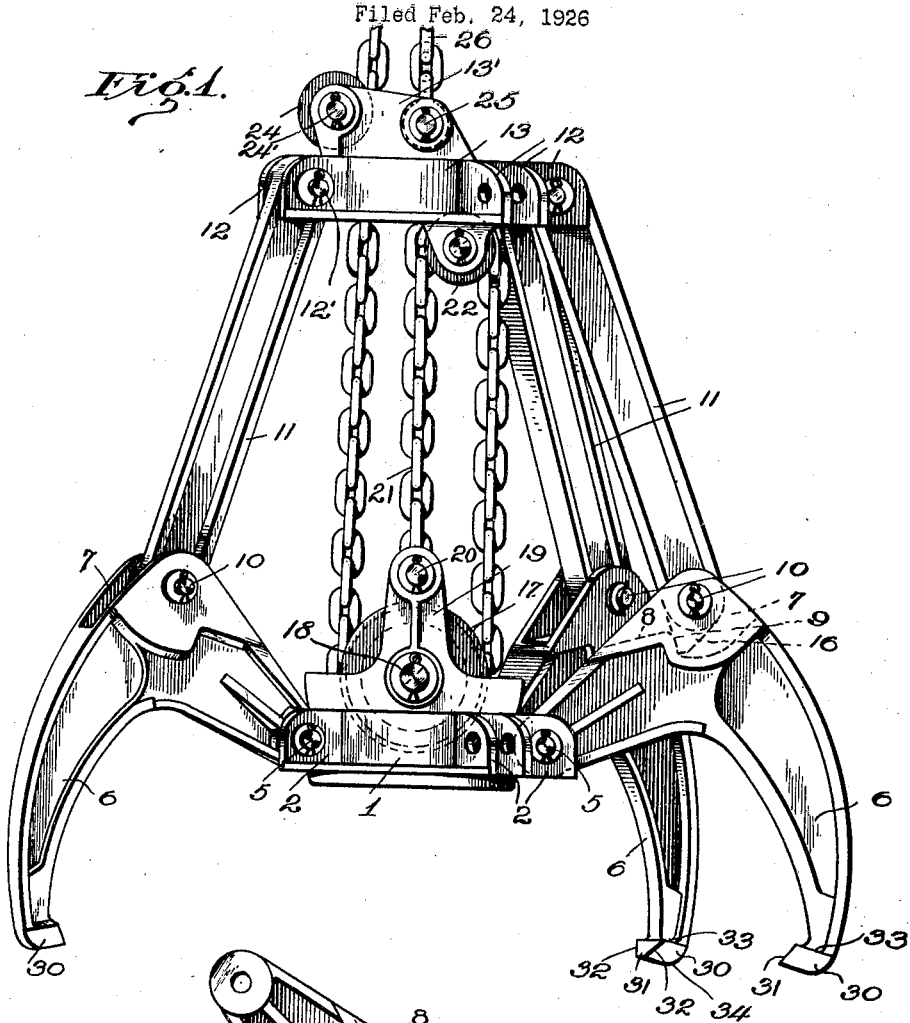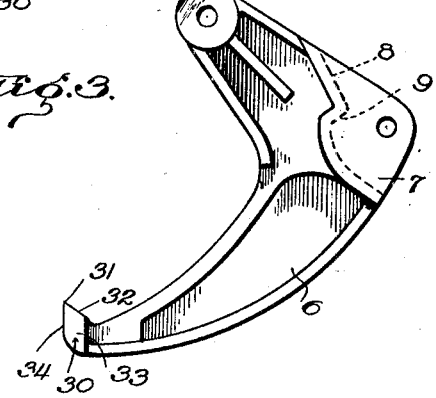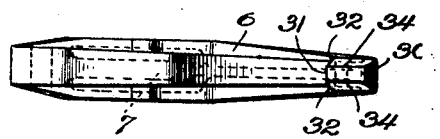

1,587,479

UNITED STATES PATENT OFFICE.

THOMAS L. DUROCHER, OF DETOUR, MICHIGAN.

ROCK GRAB.

Application filed February 24, 1926. Serial No. 90,361.

The invention relates to improvements in rock grabs of the type shown in my prior Patent No. 1,216,423, dated February 20, 1917, and has for its object to provide the load engaging arms of the grab with cutting teeth, which will insure a positive biting grip of the several arms into the surfaces of rocks and heavy objects to be lifted and moved by the grab and thereby avoid the danger of the load shifting in the grab and the possibility of heavy bodies slipping out of the grab, which objectionable conditions have occurred in certain cases, when it was attempted to move very heavy rocks and like objects by grabs not provided with the special form of teeth.

The invention is illustrated in the accompanying drawings, in which:—

Fig. 1 is a vertical elevation of a five arm grab, with two of the arms removed to avoid confusion.

Fig. 2 is a side elevation of one of the grab arms.

Fig. 3 is a plan view of one of the grab arms.

Referring to the drawings, 1 indicates the lower head provided with pairs of radially extending ears 2 to receive the pivot pins 5 of the grab arms 6. Formed integrally of the head 1 is a clevis 19 provided with pairs of aligning eyes to receive pins 18 and 20, the former of which carries a sheave 17 and the latter serves as an anchor for the grab closing chain, as will be hereinafter explained.

Each of the grab arms 6 preferably consists of a heavy casting suitably reinforced with ribs and edge flanges, each casting comprising a curved section tapering towards its free end and an angularly disposed section having a pivoting eye at its free end, the general configuration of the arm being that of a heavy bell crank provided at its angular portion with a recess 7 to form ears to receive the pins 10, by means of which the operating links 11 are secured to the respective arms. The recess 7 in each of the arms is provided with a shoulder 9 adapted to be engaged by a nose on the lower end of the link 11 to limit the opening movement of the grab arm and with an adjacent shoulder 8, which engages the side of the link 11 to limit the inward or closing movement of the arm.

As heretofore constructed, the free ends of the grab arms 6 are tapered, so that the several arms merely engage the surface of the rock or other heavy object to be lifted, the engagement between the ends of the arms and the load being more or less of the frictional character, which was not sufficient to prevent the heavy loads shifting in the grab and even escaping therefrom, in certain instances. To avoid this contingency and to absolutely prevent any shifting of even the heaviest load, after engagement therewith by the grab arms, each of the arms is provided at its free end with a special form of tooth comprising a body portion 30, the longitudinal axis of which forms an acute angle with the medial line of the curved section of the arm, the general configuration of the tooth being that of a four sided prism having an inclined upper face, the meeting edges of the sides and the upper face constituting cutting edges 31, 32, 33 and 34, which will be effective in incising the surfaces of even the hardest rocks, permitting the tooth to penetrate and bite into the load and thereby secure the locking of the grab arms to the load.

Each of the links 11 is connected at its upper end by means of a pin 12' to spaced ears 12 on the upper head 13, said head 13 being provided with a housing 13' in which are secured cross pins 24' and 25, the former of which supports a guide sheave 24 and the latter serving as an anchoring attachment for the supporting chain 26 by means of which the grab is lifted and the jaws or arms 6 opened. The means for closing the jaws or arms 6 to engage the load are the same as those described in my patent aforesaid, comprising a chain 21 anchored at one end to the pin 20 carried by the clevis 19 formed integrally with the lower head, said chain passing thence over a guide pulley 22 mounted on the under side of the upper head, thence around sheave 17 mounted on the pin 18 in the lower head, upward through the upper head where it is engaged by the guide pulley 24.

When the chain 21 is slackened and the grab is supported by chain 26, the heads 1 and 13 will be separated and the links 17 will move the arms 6 to open position, as shown in Fig. 1, permitting the grab to be lowered into position to engage the rock or other object to be moved, after which the chain 21 is tightened up, causing the heads 1 and 13 to approach each other and the links 11 to swing the grab arm 6 downwardly and inwardly until the teeth on the ends of the arms bite into the surface of the rock or other load to be lifted. When it is desired to release the lifted load, it is only necessary to slacken the chain 21 and permit the lower head to move downward, thereby causing the links 11 to swing the grab arms outwardly and upwardly, so that the teeth 30 on the ends of the arms will be withdrawn from the incisions, which they previously made in the load, and free the latter.

What I claim is:

1. A rock grab comprising a lower head, a plurality of angular grab arms pivoted at one end to said head, an upper head, links connecting the upper head to said arms intermediate the ends thereof, and means to move the heads toward and from each other to cause the links to close and open said arms, the free ends of said arms being provided with angularly disposed teeth provided with multiple cutting edges.

2. A rock grab arm comprising a curved section tapering towards its free end, an angularly disposed section, and a tooth on the end of the curved section extending inwardly of the curve and having multiple cutting edges.

3. A rock grab arm comprising a curved section tapering towards its free end, an angularly disposed section, and a tooth on the end of the curved section extending inwardly of the curve and having cutting edges bounding the top and sides thereof.

In testimony whereof I affix my signature.

THOMAS L. DUROCHER.